United States Patent
Gao et al.

(10) Patent No.: US 10,903,888 B2
(45) Date of Patent: Jan. 26, 2021

(54) CONFIGURATION METHOD AND CONFIGURATION DEVICE FOR REFERENCE SIGNAL AND COMMUNICATION NODE

(71) Applicant: ZTE CORPORATION, Guangdong (CN)

(72) Inventors: Bo Gao, Guangdong (CN); Yu Ngok Li, Guangdong (CN); Zhaohua Lu, Guangdong (CN); Yifei Yuan, Guangdong (CN); Xinhui Wang, Guangdong (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 16/483,792

(22) PCT Filed: Feb. 2, 2018

(86) PCT No.: PCT/CN2018/075027
§ 371 (c)(1),
(2) Date: Aug. 6, 2019

(87) PCT Pub. No.: WO2018/141261
PCT Pub. Date: Aug. 9, 2018

(65) Prior Publication Data
US 2020/0028563 A1    Jan. 23, 2020

(30) Foreign Application Priority Data
Feb. 6, 2017 (CN) .......................... 2017 1 0067221

(51) Int. Cl.
*H04B 7/06* (2006.01)
*H04L 5/00* (2006.01)

(52) U.S. Cl.
CPC ......... *H04B 7/0695* (2013.01); *H04L 5/0051* (2013.01)

(58) Field of Classification Search
CPC .................................................. H04B 7/0695
(Continued)

(56) References Cited

U.S. PATENT DOCUMENTS

2013/0329664 A1    12/2013   Kim et al.
2016/0087708 A1*   3/2016    Kang ................... H04B 7/0619
                                                            370/312
(Continued)

FOREIGN PATENT DOCUMENTS

CN      103688586 A       3/2014
CN      103973392         8/2014
(Continued)

OTHER PUBLICATIONS

Patent Cooperation Treaty (PCT), International Search Report and Written Opinion for Application PCT/CN2018/075027 filed Feb. 2, 2018, dated Apr. 9, 2018, International Searching Authority, CN.
(Continued)

*Primary Examiner* — Lihong Yu
(74) *Attorney, Agent, or Firm* — McDonald Hopkins LLC

(57) ABSTRACT

Provided are a configuration method and configuration device for a reference signal and a communication node. The method applied to a first communication node includes: configuring configuration signaling; carrying, by the configuration signaling, parameter configuration for N reference signal resources, the parameter configuration at least includes channel characteristic requirement indication information; and sending the configuration signaling to a second communication node to enable the second communication node to obtain the parameter configuration, where N is an integer greater than or equal to 1.

16 Claims, 8 Drawing Sheets

(58) Field of Classification Search
USPC .......................................................... 375/267
See application file for complete search history.

(56) References Cited

U.S. PATENT DOCUMENTS

| | | |
|---|---|---|
| 2016/0135180 A1 | 5/2016 | Yuan et al. |
| 2016/0142189 A1 | 5/2016 | Shin et al. |
| 2017/0099172 A1* | 4/2017 | Ren .......................... H04L 27/26 |

FOREIGN PATENT DOCUMENTS

| | | |
|---|---|---|
| CN | 104081683 A | 10/2014 |
| CN | 105207705 | 12/2015 |
| CN | 105612780 | 5/2016 |
| EP | 3512243 | 7/2019 |
| WO | 2014059581 | 4/2014 |

OTHER PUBLICATIONS

Office Action dated Jan. 31, 2019, Chinese Patent Application No. 201710067221.4.
ZTE Microelectronics, "Discussion on QCL" R1-1611413 on QCL and QCB for NR, third generation partnership project, Mobile Competence Center; France. There is No date for this document.
Ericsson, "Discussion on QCL", R1-1609766 Discussion on QCL, Third generation partnership project, Mobile Competence Center; France. There is no date for this document.
European Supplementary Search Report for Application No. 18747626.2, PCT/CN2018/075027, dated Oct. 30, 2020, 11pgs., European Patent Office, Germany.

\* cited by examiner

US 10,903,888 B2

CONFIGURATION METHOD AND CONFIGURATION DEVICE FOR REFERENCE SIGNAL AND COMMUNICATION NODE

CROSS-REFERENCE TO RELATED APPLICATION

This application is a 35 U.S.C. 371 national stage filing of PCT Application No. PCT/CN2018/075027 filed on Feb. 2, 2018, which claims priority to Chinese Patent Application No. 201710067221.4, filed on Feb. 6, 2017, each of which are incorporated herein in their entirety by reference.

TECHNICAL FIELD

The present disclosure relates to communications and, in particular, to a configuration method and configuration device for a reference signal and communication node.

BACKGROUND

The high frequency band with ultra wide bandwidths (i.e., millimeter wave communications) will become an important development direction in the future mobile communication and attracts the attention of the global academia and industry. Especially, at present, the advantages of millimeter waves become increasingly attractive with increasingly congested spectrum resources and a huge number of accesses to physical networks. Standardization has been started in many standard organizations such as the Institute of Electrical and Electronics Engineers (IEEE) and the 3rd Generation Partnership Project (3GPP). In 3GPP standard groups, high frequency band communications become an important innovation point of a 5G new radio access technology (New RAT) with its significant advantage of wide bandwidths.

However, the high frequency band communications also face the challenges of link attenuation. Specifically, the challenges include large propagation path losses, being greatly absorbed by air (especially oxygen) and being severely affected by rain attenuation. Facing these challenges, a high frequency band communication system may acquire high antenna gains and resist signal transmission losses by means of a multi-antenna array and beamforming using characteristics such as short wavelength and easy antenna integration of the high frequency band, thereby ensuring a link margin and improving communication robustness.

In a training process of antenna weights (also referred to as precoding or beams), a high frequency band sending end transmits a training pilot, and a receiving end receives channels and performs channel estimation. Then the high frequency band receiving end needs to feed channel state information back to the sending end so that the receiving end and the sending end may select, from optional antenna weight pairs of the receiving end and sending end, multiple groups of antenna weight pairs of the receiving end and sending end which may be used for multi-path data transmission, thereby improving overall spectral efficiency.

In the existing millimeter wave communication system, especially, at a beam sweeping stage, configuration of the existing reference signal limits the flexibility of performing the beam measurement by the sending end and the receiving end; meanwhile, in a multi-user scenario, the reference signal cannot be effectively shared to other users, so that a utilization rate of the reference signal is reduced, thereby influencing the improvement of the spectrum efficiency.

SUMMARY

To overcome the above defects in the existing art, the present disclosure provides a configuration method and a configuration device for a reference signal and a communication node for solving a problem in which configuration of the reference signal limits flexibility of the beam measurement.

To solve the above problems, in the present disclosure, a configuration method for a reference signal is provided to apply to a first communication node, and the method includes:

configuring configuration signaling, where the configuration signaling carries parameter configuration for N reference signal resources, where the parameter configuration at least includes channel characteristic requirement indication information; and sending the configuration signaling to a second communication node so that the second communication node obtains the parameter configuration, where N is an integer greater than or equal to 1.

To solve the above problems, in the present disclosure, a configuration device for a reference signal is provided to apply to a first communication node, and the device includes: a configuration module and a sending module.

The configuration module is configured to configure configuration signaling, wherein the configuration signaling carries parameter configuration for N reference signal resources, where the parameter configuration at least includes channel characteristic requirement indication information; and The sending module is configured to send the configuration signaling to a second communication node so that the second communication node obtains the parameter configuration, where N is an integer greater than or equal to 1.

To solve the above problems, in the present disclosure, a communication node including any configuration device described above is provided.

To solve the above problems, a communication node in the present disclosure includes a processor and a storage device, the storage device stores multiple instructions to implement a configuration method for a reference signal, and the processor executes the multiple instructions to implement:

configuring configuration signaling; carrying, by the configuration signaling, parameter configuration for N reference signal resources, where the parameter configuration at least includes channel characteristic requirement indication information; and sending the configuration signaling to a second communication node so that the second communication node obtains the parameter configuration, where N is an integer greater than or equal to 1.

The present disclosure further provides a computer storage medium, which is configured to store execution instructions for executing any method described above.

The present disclosure has beneficial effects described below.

The configuration method, configuration device and communication node, through configuring the channel characteristic requirement indication information of the reference signal resource in the configuration signaling, a beam sweeping training for a sending end, a receiving end and a joint receiving and sending end is implemented. Through the flexible channel characteristic requirement information, limitations of the available beams at the sending end and the receiving end are reduced, thereby improving the indication transparency, and effectively improving the flexibility at the time of performing the beam measurement at the sending end and the receiving end.

DETAILED DESCRIPTION

Figure 1:
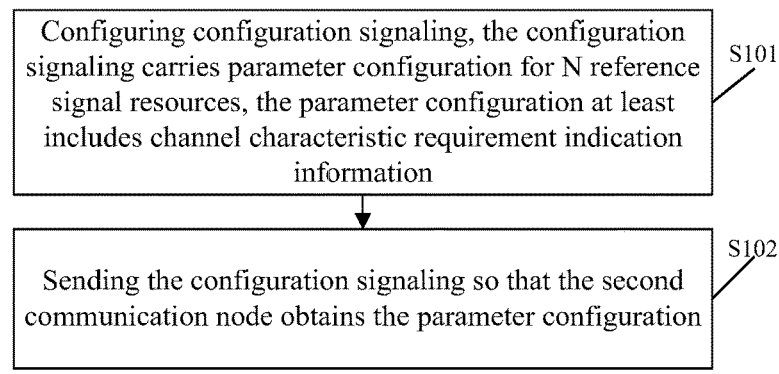
FIG. 1 is a flowchart of a configuration method for a reference signal in an embodiment of the present disclosure.

To at least solve a problem in which configuration of the reference signal limits flexibility of the beam measurement in a high frequency band 5G mobile communication or millimeter wave communication scenario in the existing art, the present disclosure provide a configuration method for a reference signal, a configuration device for a reference signal and a communication node. The present disclosure will be described in detail in connection with the embodiments and the drawings. It is to be understood that specific embodiments described herein are intended to explain the present disclosure, and not to limit the present disclosure.

A configuration method for a reference signal in the present disclosure, applied to a first communication node, includes steps S101 and S102 described below.

In step S101, configuration signaling is configured. The configuration signaling carries parameter configuration for N reference signal resources. The parameter configuration at least includes channel characteristic requirement indication information.

In step S102, the configuration signaling is sent to a second communication node so that the second communication node obtains the parameter configuration, and the reference signal is received according to the parameter configuration, where N is an integer greater than or equal to 1.

The embodiment of the present disclosure implements a beam sweeping training for a sending end, a receiving end and a joint receiving and sending end through configuring the channel characteristic requirement indication information of the reference signal resource in the configuration signaling, reduces limitations of the available beams at the sending end and the receiving end through the flexible channel characteristic requirement information, thereby improving the indication transparency, and effectively improving the flexibility at the time of performing the beam measurement at the sending end and the receiving end.

It is to be noted that in the embodiment of the present disclosure, the first communication node performs reference signal configuration on the second communication node, a beam sweeping P1/2/3 is decided by a corresponding TPR (the first communication node), a sweeping number of the receiving beam applied by the UE (the second communication node) has no binding relationship with the decision of the TRP.

On the basis of the above embodiment, modified embodiments of the above embodiment are further proposed, and it is to be noted that, for the brevity of description, merely differences from the above embodiment will be described in the modified embodiments.

In an embodiment of the present disclosure, sending the configuration signaling to the second communication node includes: sharing all or part of the configuration signaling to multiple second communication nodes.

The embodiment of the present disclosure implements the reference signal sharing under multiple users in a sharing mode, which saves the reference signal resources.

In an embodiment of the present disclosure, the method further includes that: the configuration signaling indicates to divide the N reference signal resources into S reference signal processes. Where an ith reference signal process includes Si reference signal resources, S and Si are integers greater than or equal to 1 and less than or equal to N, a sum of all Si is equal to N.

In an embodiment of the present disclosure, a same antenna port under different reference signal resources has same sending end precoding or a same sending beam; or
  a same antenna port under a same reference signal resource has same sending end precoding or a same sending beam; or
  all antenna ports under the same reference signal resource have same sending end precoding or a same sending beam.

In an embodiment of the present disclosure, the channel characteristic requirement indication information at least includes one of:
  the channel characteristic requirement information, the relevant information on the antenna port or mapping information of the channel characteristic requirement information and the relevant information on the antenna port.

In a specific implementation mode of the present disclosure, the relevant information on the antenna port at least includes one of: antenna port information or antenna port density configuration information. For example, the antenna port information is an antenna port index.

The antenna port density configuration information includes one of: configuration information of one of: a frequency domain in which the any antenna port is located, a time domain in which the any antenna port is located, and a sequence used by any antenna port. The configuration information includes at least one of: a pattern, a position, an index or a number.

Specifically, for any antenna port, the antenna port density configuration information at least includes one of:
- an antenna port and time domain configuration information of the antenna port;
- the antenna port and the frequency domain configuration information of the antenna port; or
- the antenna port and sequence configuration information used by the antenna port.

In another specific implementation mode of the embodiment of the present disclosure, the method further includes:
- acquiring the antenna port density configuration information from a pre-configured antenna port density configuration information set.

That is, the antenna port density configuration information is from an antenna port density configuration information set, i.e., an antenna port density is configured through indicating elements in the antenna port density configuration information set.

The antenna port density configuration information set is configured through sending configuration signaling to the second communication node from the first communication node.

Furthermore, the antenna port density configuration information acts on a reference signal level, i.e., under a specific reference signal, each of enabled antenna ports has a same density, or follows a set antenna port pattern (the pattern is bound to the antenna port density configuration information).

In another implementation mode of the present disclosure, the antenna port on a time-frequency code resource position indicated by the mapping information follows a specific channel characteristic requirement. Alternatively, an antenna port on a time-frequency code resource position indicated by the mapping information and relevant information of an antenna port on one associated time-frequency code resource position follow the channel characteristic requirement.

That is, the antenna port on the time-frequency code resource position mapped by the channel characteristic requirement indication information follows the specific channel characteristic requirement.

Alternatively, the mapped antenna port on the time-frequency code resource position and relevant information of the antenna port on another associated time-frequency code resource position follow the channel characteristic requirement.

The mapping information includes at least one of:
- explicit output mapping information;
- mapping information selected from a pre-configured mapping relationship set; or preset mapping information.

Specifically, the mapping information includes explicit output mapping information, such as a bitmap.

The mapping information further includes selecting a mapping relationship from an optional mapping relationship set for mapping. The mapping information further includes a predefined mapping rule.

The mapping information may be indicated through the configured channel characteristic requirement indication.

In an embodiment of the present disclosure, the channel characteristic requirement is an element of a channel characteristic requirement set.

Furthermore, the channel characteristic requirement set includes K channel requirement elements, where K is an integer greater than or equal to 1.

Each channel characteristic requirement is distinguished in that types of the channel characteristic involved in the channel characteristic requirement are different, or types of the requirements are different.

In the K channel requirement elements, K1 channel characteristic requirement elements are a special case of K2 channel characteristic requirement elements; where K1 and K2 are both integers greater than or equal to 1 and less than or equal to K. That is, if K2 channel characteristic requirements are met, K1 channel characteristic requirements are not necessarily met, but if K1 channel characteristic requirements are met, K2 channel characteristic requirements are met.

In an embodiment of the present disclosure, a channel characteristic includes any one or a combination of any two or more of: a quasi-co-location (QCL), a quasi-co-beam, a sending end precoding, a receiving end spatial filter, a receiving signal power, a horizontal transmission azimuth, a vertical transmission azimuth, a horizontal arrival azimuth, a vertical reception azimuth, average arrival time, cluster arrival time, a correlation coefficient of a time domain channel response, a correlation coefficient of a frequency domain channel response and a spatial correlation coefficient.

The QCL at least includes: delay spread, Doppler spread, Doppler shift, an average gain, an average delay and spatial parameter information.

In an embodiment of the present disclosure, a channel characteristic requirement is a quasi-co-location assumption.

The requirement is an element in a requirement set; and the requirement set includes S requirement elements under different constraint intensities. The requirement may be divided into a same requirement and a basically same requirement. If the identical degree between constraint intensities of two elements reaches a preset threshold, it may be called as basically same. For example, the identical degree between constraint intensity of an element 1 and constraint intensity of an element 2 reaches above 90%, or above 80%.

Specifically, the constraint intensity includes at least one of:
- sending end precoding of the reference signals being the same;
- sending end spatial filters of the reference signals being the same;
- receiving end spatial filters of the reference signals being the same;
- sending end precoding of the reference signals basically being the same;
- sending end spatial filters of the reference signals basically being the same; or
- receiving end spatial filters of the reference signals basically being the same.

In an embodiment of the present disclosure, the method further includes:
  in condition that the channel characteristic requirement indication information is configured to be a first channel characteristic requirement, the sending beam or a sending end precoding of the reference signal of the first communication node remains unchanged, and a receiving beam/a receiving end spatial filter of the second communication node may be different; or
  in condition that the channel characteristic requirement indication information is configured to be a second channel characteristic requirement, the sending beam of the reference signal of the first communication node may be different, and the receiving beam of the second communication node is still received according to a receiving beam mode or a spatial filtering mode indicated according to the channel characteristic requirement; or
  in condition that the channel characteristic requirement indication information is configured to be a third channel characteristic requirement, the sending beam or the sending end precoding of the reference signal of the first communication node may be different, and the receiving beam/the receiving end spatial filter of the second communication node may be different.

Furthermore, the third channel characteristic requirement is a special case of the first channel characteristic requirement.

The third channel characteristic requirement is a special case of the second channel characteristic requirement.

In another embodiment of the present disclosure, the method further includes that:
  in condition that the channel characteristic requirement indication information is configured to be the first channel characteristic requirement, all N reference signal resources follow the first channel characteristic requirement; or
  in condition that the channel characteristic requirement indication information is configured to be the second channel characteristic requirement, all N reference signal resources follow the second channel characteristic requirement; or
  in condition that the channel characteristic requirement indication information is configured to be the third channel characteristic requirement, each of R1 reference signal resources follows the first channel characteristic requirement, each of R2 reference signal resources follows the second channel characteristic requirement; where R1 and R2 are both integers greater than or equal to 1 and less than or equal to N.

Furthermore, T1 reference signal resources in the R1 reference signal resources have the same time domain resource interval or the frequency domain resource interval, where T1 is an integer greater than or equal to 1 and less than or equal to R1.

In T2 reference signal resources in the R2 reference signal resources have the same time domain resource interval or the frequency domain resource interval, where T2 is an integer greater than or equal to 1 and less than or equal to R1.

In another embodiment of the present disclosure, the: parameter configuration further includes configuration on measurement limitation information for a preset reference signal.

The measurement limitation information is configured for limiting the second communication node to measure the reference signal.

Furthermore, the measurement limitation information acts on Y reference signals, where Y is an integer greater than or equal to N.

Furthermore, the method further includes:
  marking the measurement limitation information through a bitmap, or selecting the measurement limitation information from a preset limitation rule.

The marking the measurement limitation information through the bitmap includes:
  in condition that a first character is configured on the bit map, indicating the second communication node to perform measurement; or
  in condition that a second character is configured on the bit map, indicating the second communication node to not to perform measurement.

In another embodiment of the present disclosure, the configuration signaling is transmitted through one of the following manners:
  a time-frequency code resource bearing association information related to the configuration signaling;
  an explicitly outputted correlation value; or
  a jointly encoding of the time-frequency code resource bearing association information related to the configuration signaling and the explicitly outputted correlation value.

A channel characteristic requirement refers to at least one of the sending beam, the sending end precoding or a transmission node configured for sending the reference signal.

In another embodiment of the present disclosure, before configuring the configuration signaling, the method further includes:
  receiving trigger signaling carrying the reference signal resource configuration sent by the second communication node; and
  configuring the configuration signaling according to the trigger signaling.

The reference signal resource configuration includes at least one of:
  a channel characteristic requirement;
  a number of reference signal resources without the channel characteristic requirement;
  the number of reference signal resources under the channel characteristic requirement; or limitation information of the channel characteristic requirement.

It is to be noted that those skill in the art that all or part of the steps in the methods of the above embodiments may be implemented by related hardware instructed by one or more computer programs, these programs may be stored in a computer-readable storage medium, and when these programs are executed, the following steps are included.

Configuration signaling is configured, the configuration signaling carries parameter configuration for N reference signal resources, and the parameter configuration at least includes channel characteristic requirement indication information.

The configuration signaling is sent to a second communication node so that the second communication node obtains the parameter configuration, where N is an integer greater than or equal to 1.

The storage medium may be a RAM, a flash memory, a ROM, a EPROM, a EEPROM, a register, a hard disk, a mobile hard disk, an optical disk, etc.

The present disclosure is briefly described through specific application scenarios.

The reference signal involved in the present disclosure includes at least one of: a cell reference signal (CRS), a channel state information-reference signal (CSI-RS), a CSI-RS for beam management, a channel state information-interference measurement (CSI-IM) signal, a demodulation reference signal (DMRS), a downlink demodulation reference signal, an uplink demodulation reference signal, a sounding reference signal (SRS), a phase tracking-reference signal (PT-RS), a mobility reference signal (MRS), a beam reference signal (BRS) or a beam refinement reference signal (BRRS).

The channel characteristic, which is also called as channel feature, may include a physical propagation channel characteristic such as a horizontal transmission azimuth, a vertical transmission azimuth, a horizontal reception azimuth and a vertical reception azimuth, and also includes characteristics of radio frequency and baseband circuits, such as an antenna element pattern, an antenna group, an antenna panel, a TXRU, a receiving beam set, an antenna placement, a baseband time offset, a frequency offset and phase noise.

A beam may be a resource (such as a sending end precoding, a receiving end precoding, an antenna port, an antenna weight vector and an antenna weight matrix). A beam symbol may be replaced with a resource index because the beam may be bound to some time-frequency code resources for transmission. The beam may also be in a transmission (sending/receiving) mode. The transmission mode may include space multiplexing, frequency domain or time domain diversity and the like.

A receiving beam indication means that the sending end may indicate through a current reference signal, an antenna port, and a quasi-co-location (QCL) assumption between the antenna port and the reference signal fed back and reported by a UE.

The receiving beam refers to beams at the receiving end which does not need to be indicated, or beam resources of the receiving end which are indicated by the sending end through the current reference signal, the antenna port and the QCL between the antenna port and the reference signal fed back and reported by the UE.

Parameters involved in the QCL at least include: a Doppler spread, a Doppler shift, a delay spread, an average delay and an average gain, and may also include: spatial parameter information, such as an arrival azimuth, a spatial correlation of the receiving beam, the average delay and a frequency domain channel response correlation (including phase information).

Figure 2:
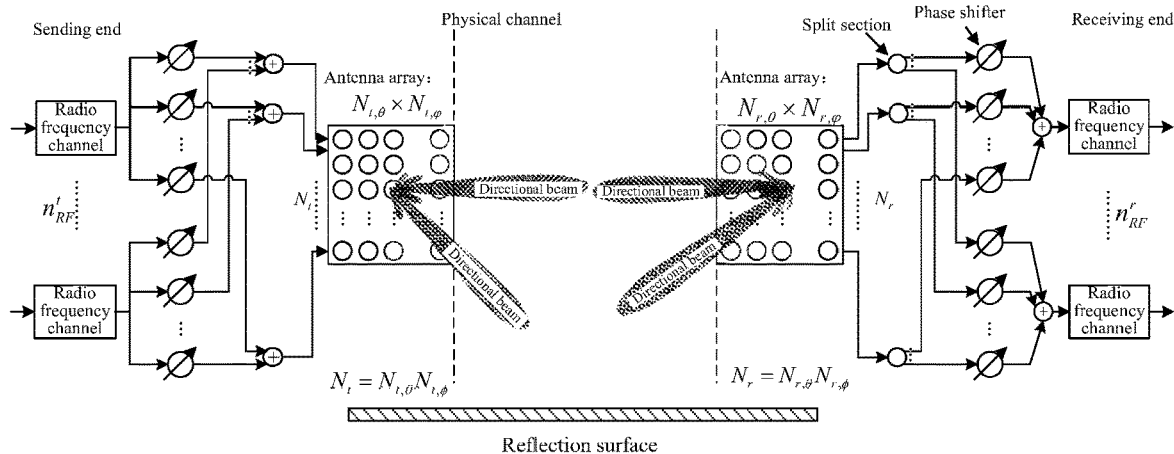
FIG. 2 is a structural diagram of a transceiver for hybrid precoding (hybrid analog and digital beamforming) in an embodiment of the present disclosure.

As shown in FIG. 2, the sending end and the receiving end are configured with multiple antenna units and multiple radio frequency links. Each RF link is connected to an antenna array unit (a partial connection scenario is not excluded), and each antenna unit has a digital keying phase shifter. A high frequency band system implements beamforming of an analog end by loading different phase shifts on signals of each antenna unit. Specifically, in a hybrid beamforming transceiver, multiple RF signal streams are included. Each signal stream is loaded with a precoding AWV via the digital keying phase shifter and sent from the multiple antenna units to a high frequency band physical propagation channel. At the receiving end, RF signal streams received by the multiple antenna units are weighted and combined into a single signal stream, and after radio frequency demodulation is perform at the receiving end, a receiver finally obtains multiple received signal streams which are sampled and received by a digital baseband. Therefore, the hybrid precoding (hybrid analog and digital beamforming) transceiver may simultaneously generate RF beams in multiple directions.

Figure 3A:
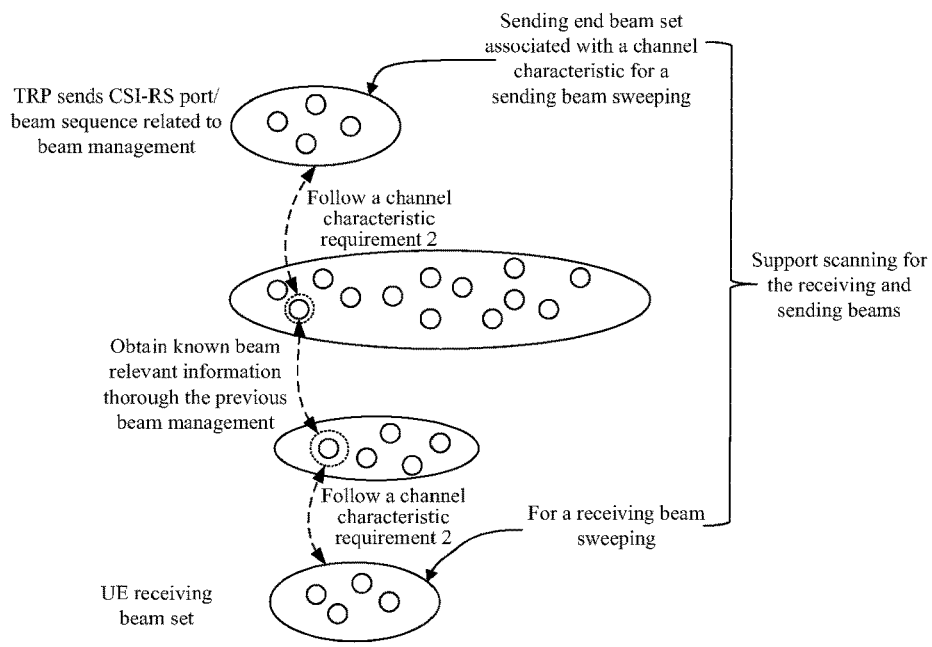
FIGS. 3A, 3B and 3C are embodiments illustrating beam sweeping based on a channel characteristic requirement indication in an embodiment of the present disclosure.
Figure 3B:
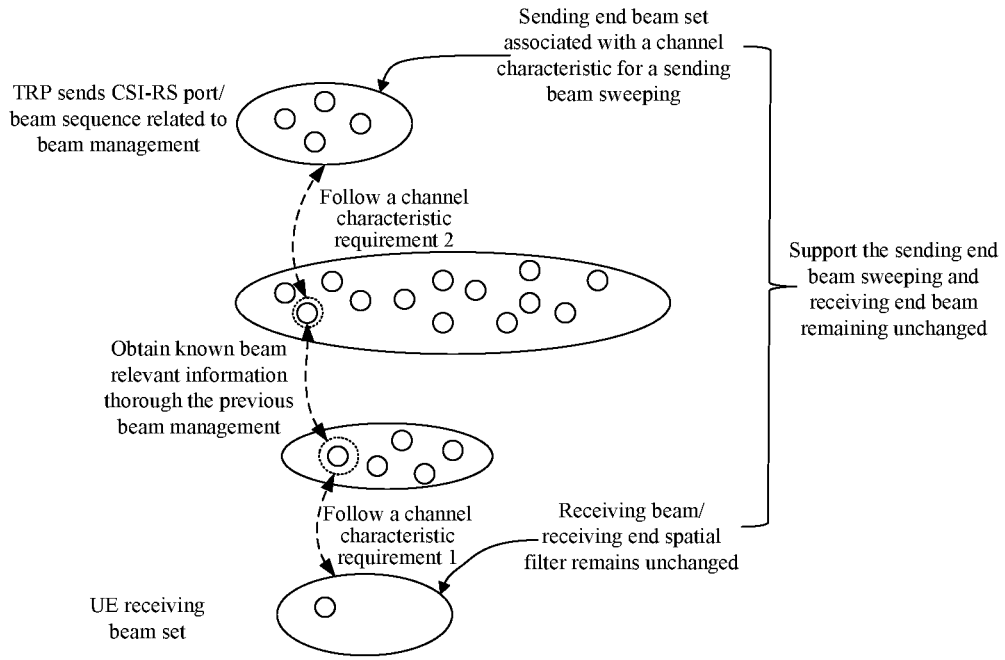
Figure 3C:
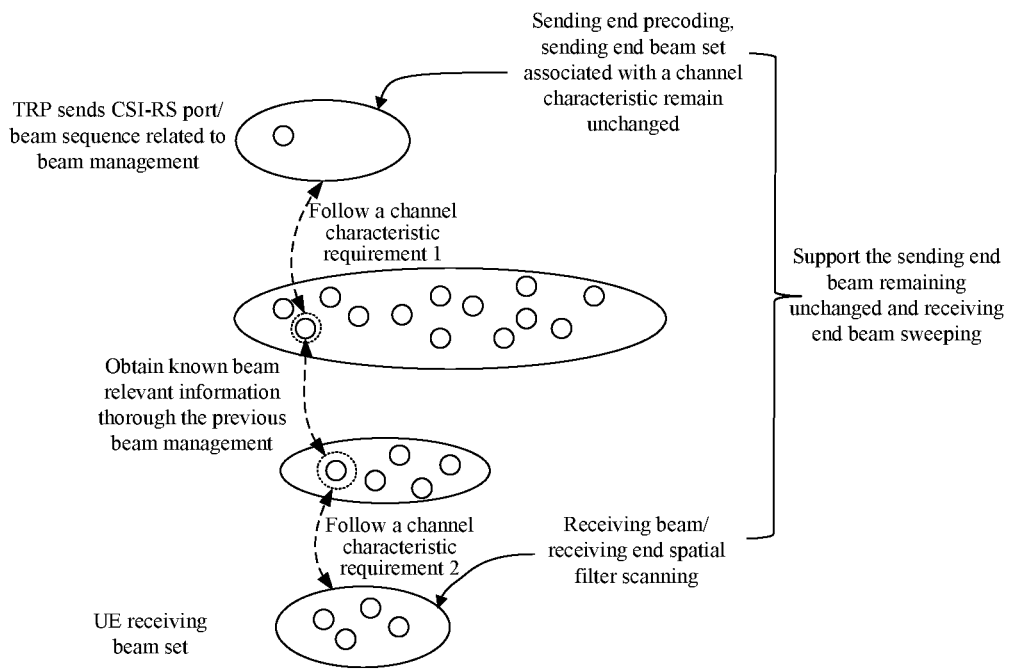

As shown in FIGS. 3A to 3C, with known beam-related information obtained by previous beam management, an indication of a downlink receiving beam between the TRP and UE may be performed according to a channel characteristic requirement assumption (e.g., QCL). Accordingly, for beam refinement, beam tracking, and other purposes, the TRP and the UE may further perform training on sending beams and receiving beams.

Here, it is assumed that two types of channel characteristic requirement (e.g., QCL) indications, i.e., a channel characteristic requirement 1 represents that precoding configuration of the sending (or receiving) beam is consistent with the associated sending beam at a previous beam management stage, i.e., a strict channel characteristic requirement. However, a channel characteristic requirement 2 represents that the precoding of the sending (or receiving) beam and the sending (or receiving) beam at an associated beam management stage are similar, but may be different, i.e., a non-strict channel characteristic requirement. It is to be noted that even the strict channel characteristic requirement does not mean that wireless channels seen by the baseband at the receiving end are identical because the channel characteristic may be varied in time. In other words, the channel characteristic requirement 1, relative to the channel characteristic requirement 2, is added with a requirement that the sending end precoding and the receiving end precoding need to be consistent.

Channel characteristics requirements may be applied to the sending end, or be jointly applied to the receiving end. For example, when the first type of channel characteristic requirement is configured, the sending beam or the sending end precoding of the reference signal of the first communication node remains unchanged, but the receiving beams or the receiving end spatial filters of the second communication node may be different; or when the second type channel characteristic requirement is configured, the sending beams of the reference signals of the first communication node may be different; but the receiving beam of the second communication node is still received according to a receiving beam mode or a spatial filtering mode indicated by the channel characteristic requirement, or when the third type channel characteristic requirement is configured, the sending beams or the sending end precoding of the first communication node may be different, but the receiving beams or the receiving end spatial filters of the second communication node may be different.

The channel characteristic requirement indication may be configured for an indication of the sending beam, be configured for assisting the user to receive beamforming (i.e., an indication for receiving beams) and be configured for indicating a transmission mode, a base station (BS) and a transmission node (TRP).

Specifically, FIG. 3A is an embodiment of a sending and receiving beam sweeping based on the channel characteristics requirement indication in the present disclosure. The association between a sending beam set and the sending beam at the previous beam management stage is established through the channel characteristic requirement 2, meanwhile, the receiving beam is indicated to adopt the channel characteristic requirement 2 to establish the association between a receiving beam set and the receiving beam at the previous beam management stage. Through a joint scanning for the sending and receiving beam of the associated channel characteristic, the joint beam training is implemented.

FIG. 3B is an embodiment of a sending beam sweeping based on the channel characteristics requirement indication in the present disclosure. The association between a sending beam set and the sending beam at the previous beam management stage is established through the channel characteristic requirement 2, meanwhile, the association between a receiving beam and the receiving beam at the previous beam management stage is established through the channel characteristic requirement 1. Through a scanning for the sending beam of the associated channel characteristic and a method for remaining the receiving beam, the training for the sending beam is implemented.

FIG. 3C is an embodiment of a receiving beam sweeping based on the channel characteristics requirement indication in the present disclosure. The association between the sending beam and the sending beam at the previous beam management stage is established through the channel characteristic requirement 1, meanwhile, the association between a receiving beam and the receiving beam at the previous beam management stage is established through the channel characteristic requirement 2. Through a scanning for the receiving beam of the associated channel characteristic and a method for remaining the sending beam, the training for the receiving beam is implemented.

Figure 4A:
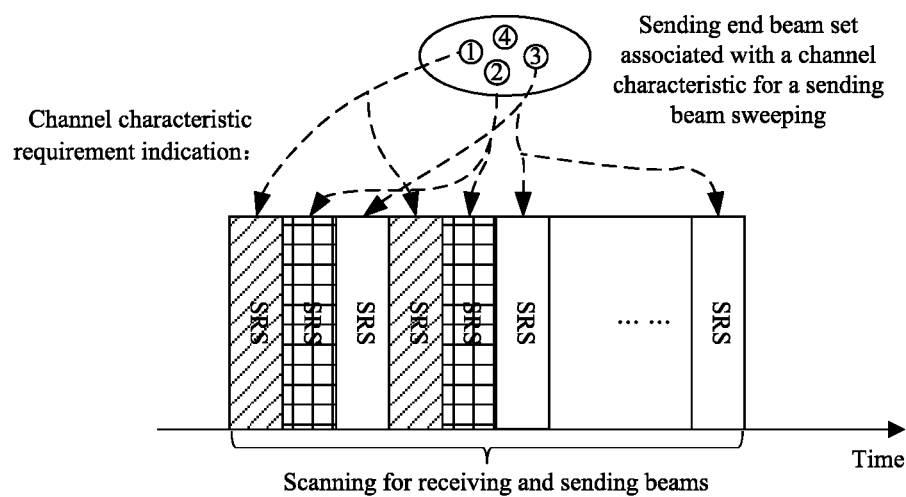
FIGS. 4A and 4B are schematic diagrams of a relationship between a channel characteristic requirement indication and a frame structure in an embodiment of the present disclosure.
Figure 4B:
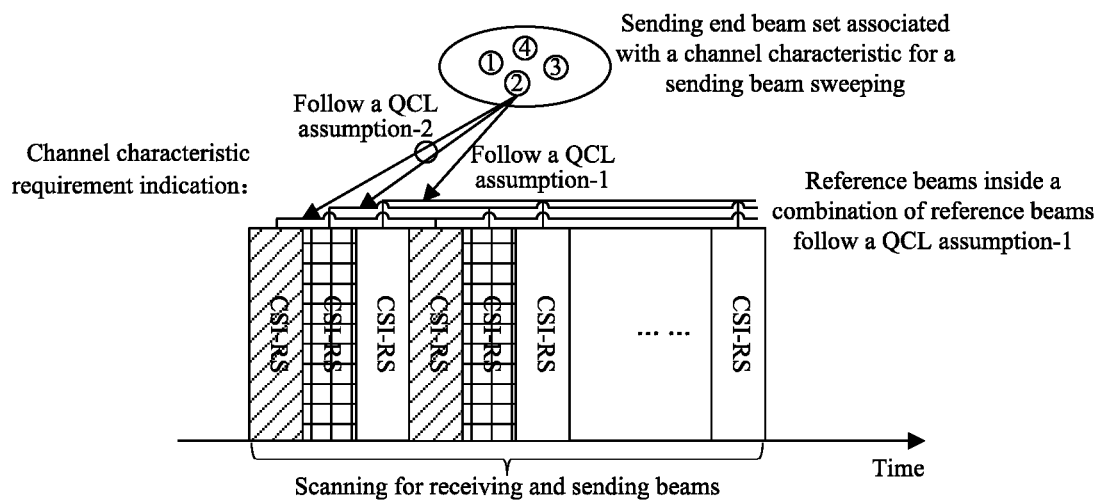

Each square in FIGS. 4A and 4B represents a reference signal resource. Here a case of two types of channel requirements is considered, one type is a channel characteristic requirement (relating to spatial parameters), and another type is similar to the case shown FIGS. 3A, 3B and 3C, and the another type includes a strict channel characteristic requirement (i.e., the channel characteristic requirement 1) and a non-strict channel characteristic requirement (i.e. the channel characteristic requirement 2). The former is a hard decision for the requirement and the latter is a soft decision for the requirement. It is emphasized that the channel characteristic requirement may be further adjusted through adjusting parameters in the channel characteristics (such as adding new parameters or removing some parameters). The different channel characteristic parameters involved naturally result in the adjustment for the constraint intensity of the channel characteristic requirement.

Specifically, FIG. 4A is a schematic diagram of the channel characteristic requirement (relating to the spatial parameters) indicating a reference signal resource in the present disclosure. An SRS signal performs the channel characteristic requirement indication by assuming to follow the channel characteristic requirement with the reference signal (including the previous uplink reference signals SRS, DMRS or downlink reference signals DMRS, CSI-RS). It is to be noted that, when an indication based on the channel characteristic requirement is performed by using the downlink reference signals such as the DMRS and CSI-RS or by using the uplink reference signals, such as DMRS and CSI-RS, the uplink and downlink need to have reciprocity or have a beam correspondence. For example, under the channel characteristic requirement indication, the sending beams of all antenna ports within the same reference signal resources remain unchanged, but under the same channel characteristic requirement indication, the sending beams between different reference signal resources may be configured to remain unchanged or be different.

FIG. 4B is a schematic diagram of a reference channel resource indication under two different constraint requirements according to the present disclosure. The channel characteristic requirement-1 (i.e., a QCL assumption-1) specifies the indicated reference signal and the previous reference signal follow the strict channel characteristic requirement, such as having exactly the same sending end precoding and the same TRP and antenna array; and the channel characteristic requirement-2 (i.e., a QCL assumption-2) specifies the indicated reference signal and the previous reference signal follow the non-strict channel characteristic requirement. It is to be noted that the indicated reference signal meeting a specific interval follows the QCL assumption-1).

Another implementation scheme is to specify a QCL assumption-3, i.e., not strictly limiting precoding, the sending beam, the receiving beam, a spatial filter or a receiving mode at the sending and receiving end, to implement a joint beam sweeping at the sending and receiving end.

Figure 5:
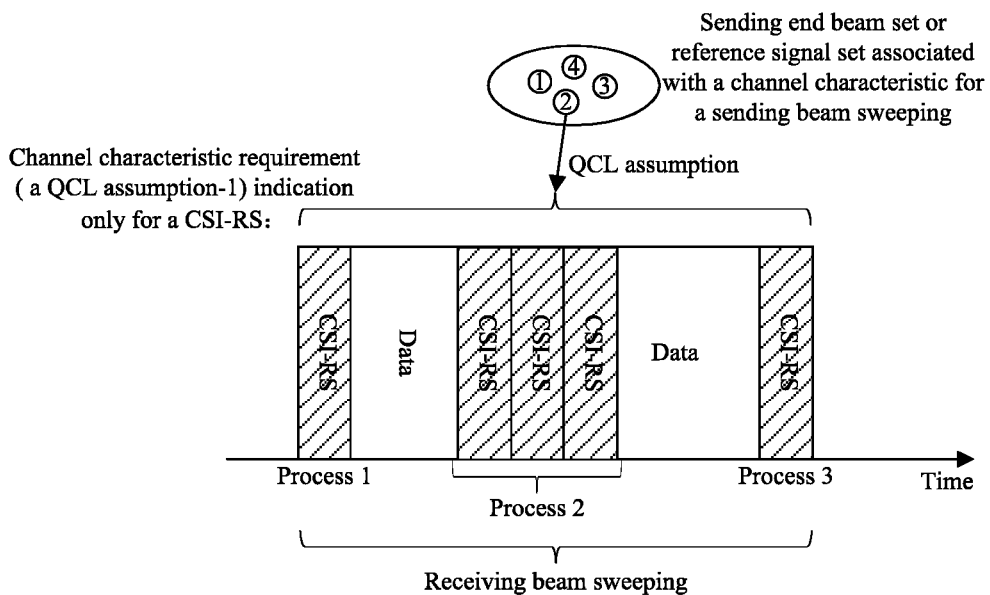
FIG. 5 is a diagram illustrating a beam sweeping for a receiving beam in multiple reference signal processed in an embodiment of the present disclosure.

FIG. 5 is a diagram illustrating a beam sweeping for a receiving beam in multiple reference signal processes in an embodiment of the present disclosure; The CSI-RS is configured to have same sending precoding through the QCL assumption (e.g. QCL-1). The reference signal resource totally includes 3 signal processes. It is to be noted that it is beneficial to share part of reference signal resources and reference signal processes to multiple users for use, i.e., reference signal process or UE-group specific. In a case where the precoding and beaming at the sending end remain unchanged, the receiving end beam performs the scanning to implement the updating of the receiving end beam or a spatial filter vector.

Figure 6:
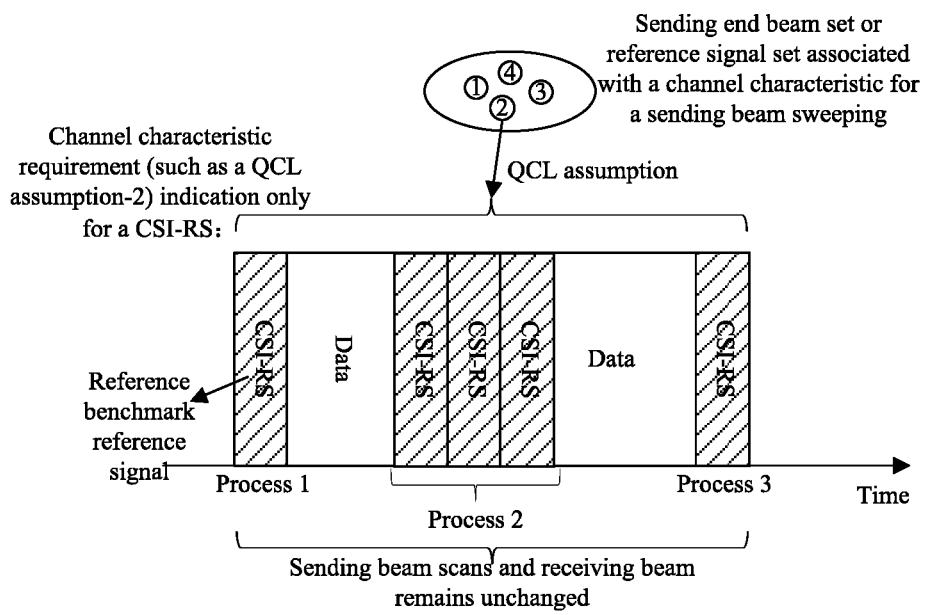
FIG. 6 is a diagram illustrating a beam sweeping for a sending beam in multiple reference signal processes in an embodiment of the present disclosure.

FIG. 6 is a diagram illustrating a beam sweeping for a sending beam in multiple reference signal processes in an embodiment of the present disclosure. The CSI-RS is configured to have different sending end precoding through the QCL assumption (such as QCL-2), and the receiving end is implied to remain the receiving beam, the receiving mode and the spatial filter vector unchanged. Similar to the method described in FIG. 4, the reference signal resource totally includes three reference signal processes. Accordingly, it is beneficial to measure the scanned sending beam by using multiple receiving ends and feed the result back to the sending ends. It is to be specifically noted that indicating a first CSI-RS to be a reference benchmark reference signal means to report a relative parameter (based on the result under a reference beam and a relative value of the result under the received reference signal) at the time of feeding back the subsequent beam grouping or measurement information, such as spatial correlation, channel response correlation, or performing beam grouping based on this. Of course, the reference benchmark reference signal configured by the first communication node may also indicate a reference signal other than the N reference signal resources described in the present disclosure. In the present disclosure, the reference benchmark reference signal may be the previous CSI-RS, MRS or CRS.

For the multiple reference signal processes described in FIGS. 5 and 6, the processes may also correspond to a case of multiple antenna panels and antenna sub-arrays, and multiple TXRUs. Each reference signal process corresponds to the training of the sending and receiving beams under one or more antenna panels and antenna sub-arrays, and the multiple TXRUs described above. The specific number depends on an antenna virtualization scheme, such as a non-coherent joint transmission and a coherent joint transmission.

Figure 7:
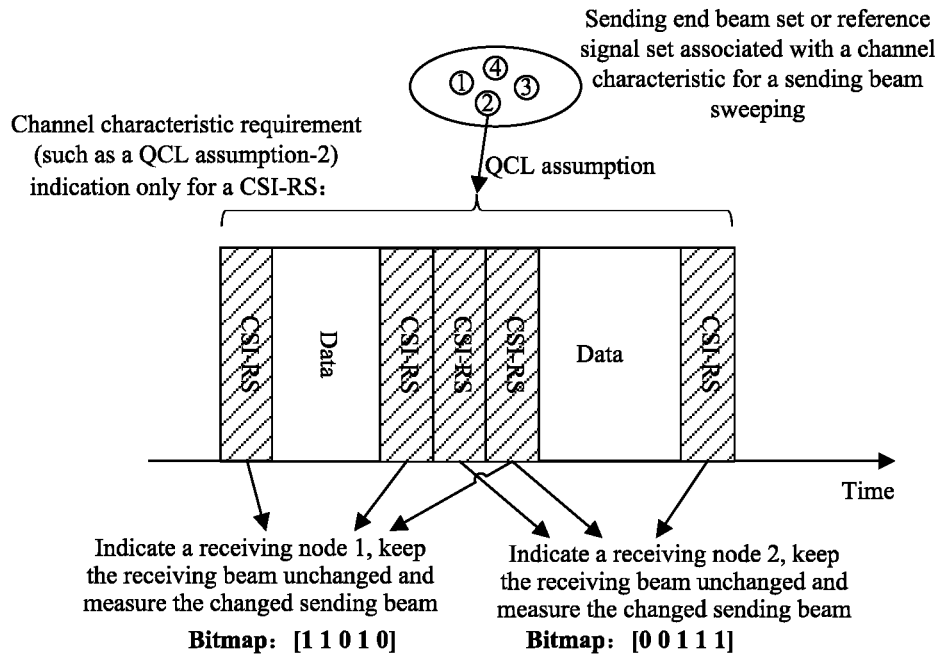
FIG. 7 is a schematic diagram of beam training performed by multiple receiving ends (i.e., multiple receiving nodes) under a bitmap in an embodiment of the present disclosure.

FIG. 7 is a schematic diagram of beam training performed by multiple receiving ends (i.e., multiple receiving nodes) under a bitmap in the present disclosure; the sending end indicates the reference signal resource to two receiving nodes and indicates that the receiving beam needs to remain unchanged. For the sending reference signal which needs to be measured at the receiving end, the sending end controls the signal by a bitmap method. 0 represents that measurement and feedback cannot be performed, and 1 represents that measurement, reception and feedback can be performed. Through the shown example, compared with the beam training under a single user, this method saves the corresponding reference signal resources.

Figure 8A:
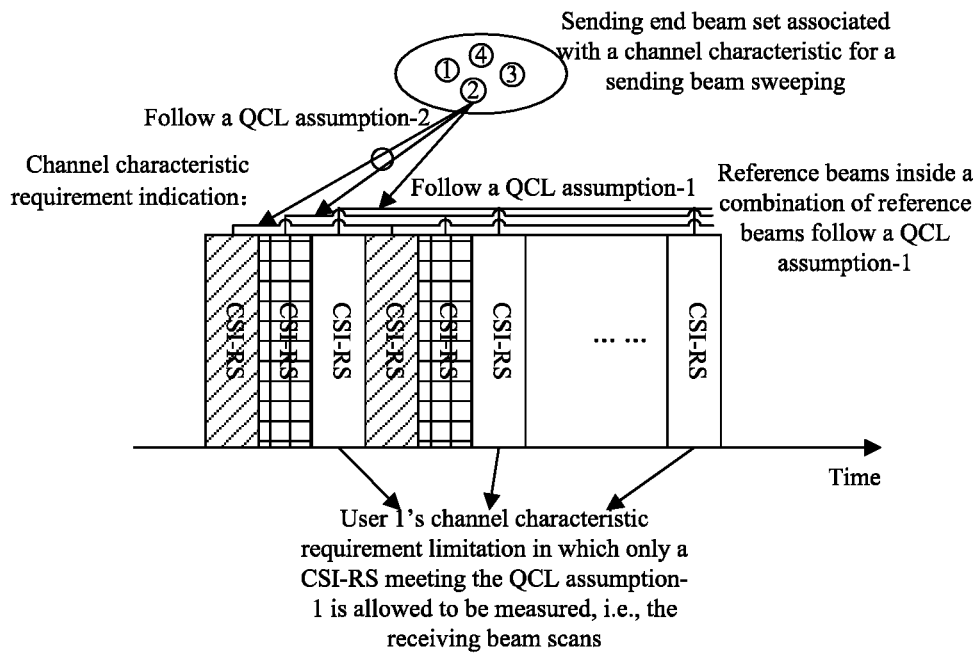
FIGS. 8A and 8B are schematic diagrams showing reference signal configuration under a channel characteristic requirement limitation in an embodiment of the present disclosure.
Figure 8B:
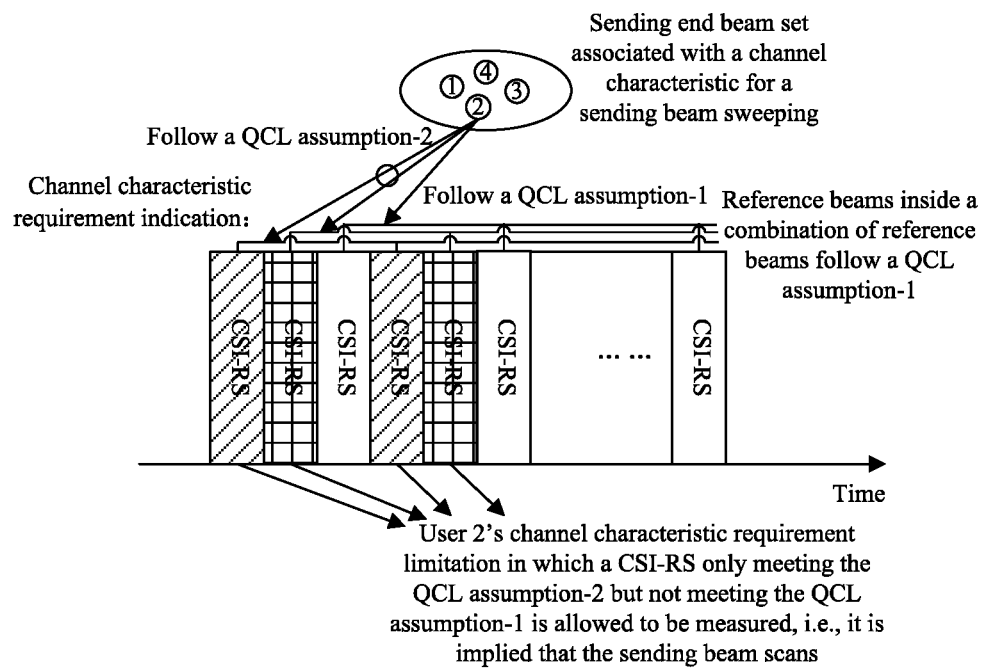

FIGS. 8A and 8B are schematic diagrams of reference signal configuration under a channel characteristic requirement limitation in the present disclosure. In this embodiment, the specific definition of the QCL-1 and the QCL-2 which are taken as channel characteristic requirements is consistent with that in FIG. 2. The channel characteristic requirement limitation may facilitate supporting different beam trainings of multiple receiving ends, such as a training only for the sending beam, a training only for the receiving beam, and a joint training for the sending and receiving beams.

Specifically, FIG. 8A illustrates that the first communication node configures the second communication node configuration (i.e. a user 2) with the channel characteristic requirement limitation in which merely a CSI-RS resource meeting the QCL assumption is allowed to be measured, i.e., the receiving beam scans. FIG. 8a illustrates that the first communication node configures the second communication node configuration (i.e. a user 1) with the channel characteristic requirement limitation in which only a CSI-RS resource meeting the QCL assumption-2 is allowed to be measured, i.e., it is implied that the sending beam scans and the receiving beam needs to remain unchanged. If the second communication node configuration is configured with the limitation of meeting QCL assumption-2, it means that the joint scanning for the sending and receiving beams may be supported.

Figure 9:
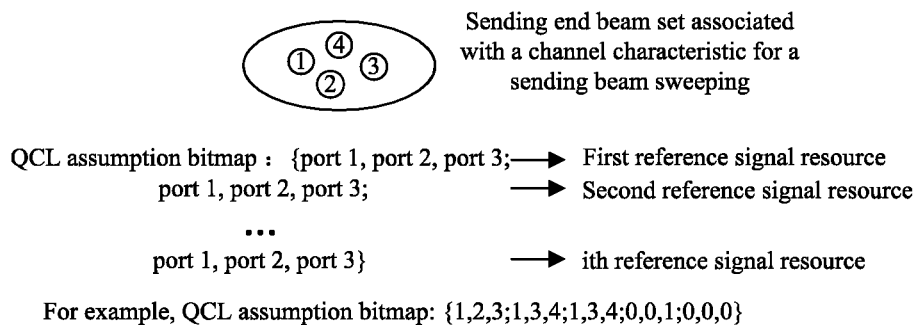
FIG. 9 is a transmission of a channel characteristic requirement indication under a bitmap in an embodiment of the present disclosure.

FIG. 9 is a transmission of a channel characteristic requirement indication under a bitmap in the present disclosure. The QCL assumption indicating the associated sending beam is implemented through the QCL being bound to a corresponding reference signal. For example, the QCL assumes that the format of the bitmap is {port 1, port 2, port 3; port 1, port 2, port 3; . . . ; port 1, port 2, port 3}. Each of ";" represents a reference signal resource, i.e., one reference signal resource may include multiple antenna ports. The QCL assumption can be applied to the antenna ports under each reference signal resource. The corresponding value indicates resource information meeting the relevant QCL assumption. For example, 1 represents a sending end beam 1 in a sending end beam set in the figure. It is to be noted that receiving measurement and feedback for the antenna port of the reference signal resource by the receiving end may be limited through a specific symbol, such as 0.

Figure 10A:
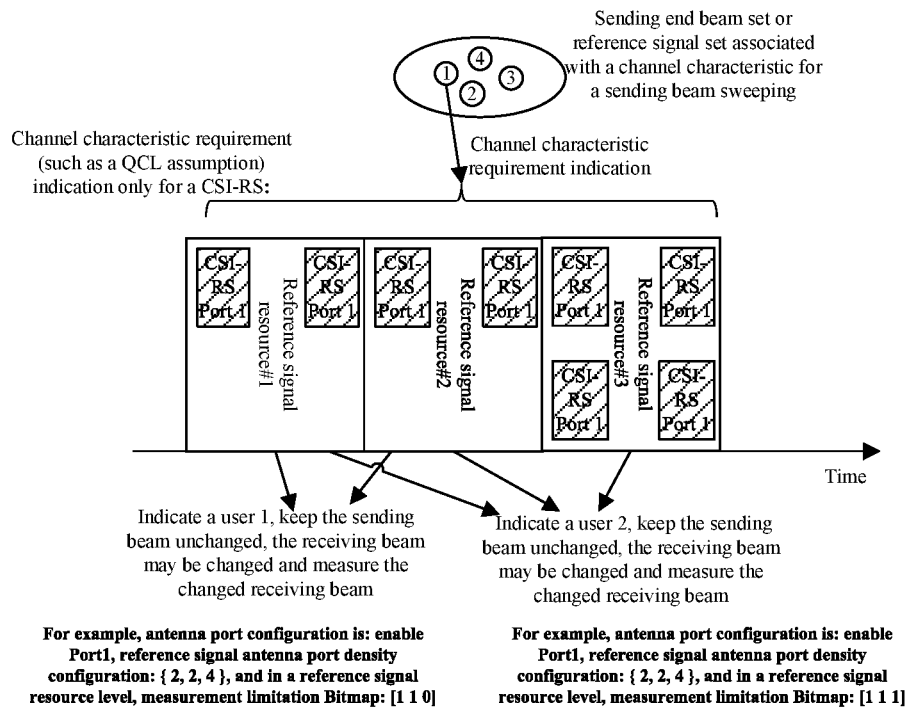
FIGS. 10A and 10B are schematic diagrams of a configuration method for a reference signal under different antenna port density in an embodiment of the present disclosure.
Figure 10B:
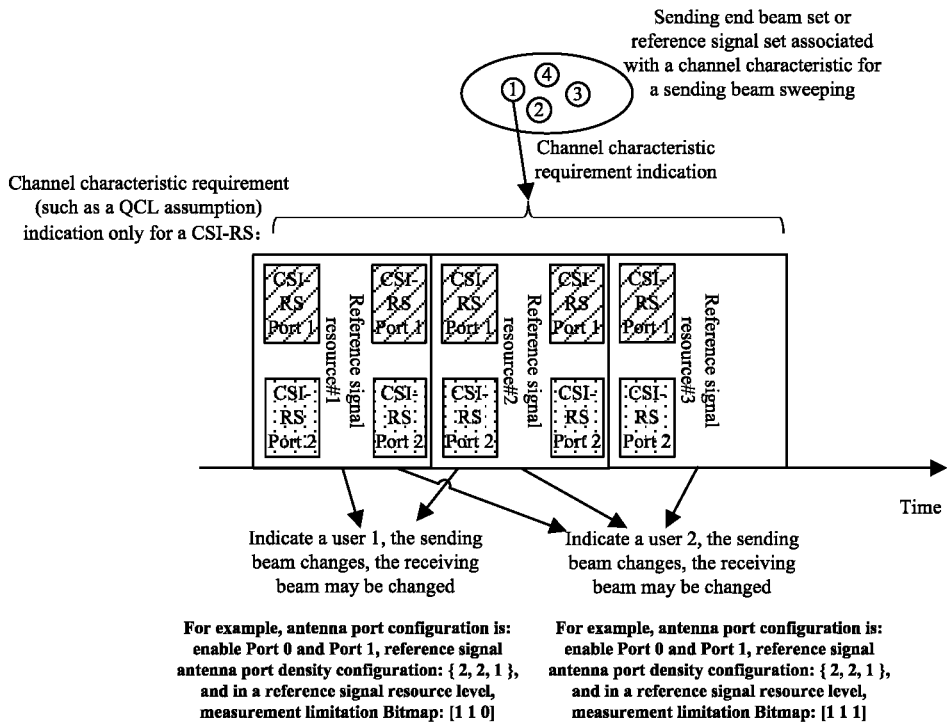

FIGS. 10A and 10B are schematic diagrams of a configuration method for a reference signal under different antenna port density in an embodiment of the present disclosure. Under different reference signal resource, the density of the antenna port may be configured, thereby implementing convenience for different user requirements and dynamic regulation. It should be emphasized that different antenna port density configuration corresponds to different reference signal pattern. It is assumed that the same antenna port represents the same precoding and sending beam. Under the N reference signal resources, configuring multiple same antenna ports may implement the scanning for the receiving beam. Similarly, configuring multiple different antenna port may implement the scanning for the sending beam. If a case of the same antenna port duplicated multiple times and multiple different ports is provided, the sending and receiving end jointly scan. Similar, it may be assumed that all antenna ports under the same reference signal resource have the same sending end precoding or the sending beam.

Specifically, FIG. 10A is a schematic diagram of a configuration method for a reference signal in which a sending beam remain unchanged and a receiving beam scan. Through the channel characteristic requirement indication, the sending beam of the reference signal is indicated. The antenna port configuration for the user 1 is as follows: enable Port1, reference signal antenna port density configuration: {2, 2, 4}, and in a reference signal resource level, measurement limitation Bitmap: [1 1 0]. The antenna port configuration for the user 2 is as follows: enable Port1, reference signal antenna port density configuration: {2, 2, 4}, and in a reference signal resource level, measurement limitation Bitmap: [1 1 1]. The same configuration information such as the channel characteristic requirement indication, enable Port1 signaling and reference signal antenna port density configuration information {2, 2, 4}, may be sent to two users through a PBCH or a common control channel. Through the above configuration, the user 1 and the user 2 share part of the reference signal resources and provide overall spectral efficiency.

Figure 11:
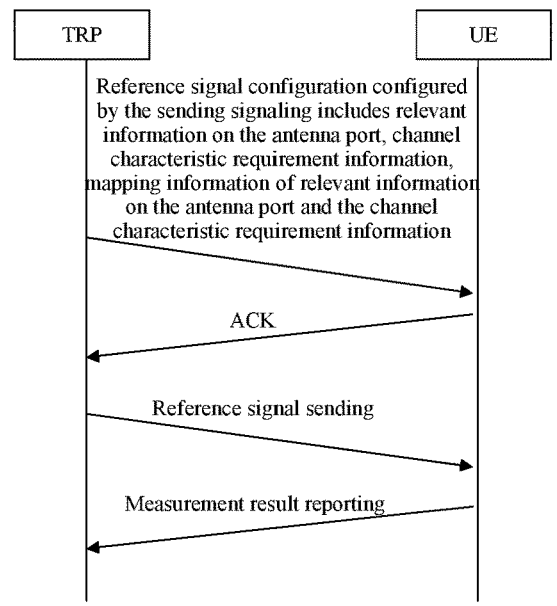
FIG. 11 is a flowchart of signaling of a configuration method for a reference signal according to an embodiment of the present disclosure.

FIG. 10B is a schematic diagram of a configuration method for a reference signal in which sending and receiving beams performs a joint scanning. Through the channel characteristic requirement indication, the sending beam of the reference signal is indicated. The antenna port configuration for the user 1 is as follows: enable Port0 and Port1, reference signal antenna port density configuration: {2, 2, 1}, and in the reference signal resource level, measurement limitation Bitmap: [1 1 0]; and the antenna port configuration for the user 2 is as follows: enable Port0 and Port1, reference signal antenna port density configuration: {2, 2, 1}, and in the reference signal resource level, measurement limitation Bitmap: [1 1 1]. Similar to FIG. 9a, the same configuration information such as the channel characteristic requirement indication, enable Port0 and Port1; and reference signal antenna port density configuration {2, 2, 1}, may be sent to two users through a PBCH or a common control channel. Different antenna port corresponds to different sending end precoding or sending beam, otherwise, different antenna port corresponds to same sending end precoding or sending beam. Through the above configuration, the joint scanning for the sending and receiving beams is implemented. FIG. 11 is a flowchart of signaling of a configuration method for a reference signal. The reference signal configuration configured by the TRP sending signaling to the UE includes relevant information on the antenna port, channel characteristic requirement information, mapping information of relevant information on the antenna port and the channel characteristic requirement information; after receiving correctly, the UE feeds back ACK information; then the TRP sends the reference signal, such as CSI-RS, MRS, SRS, etc.; and finally, the UE measures and feeds back the result to a TRP end.

Figure 12:
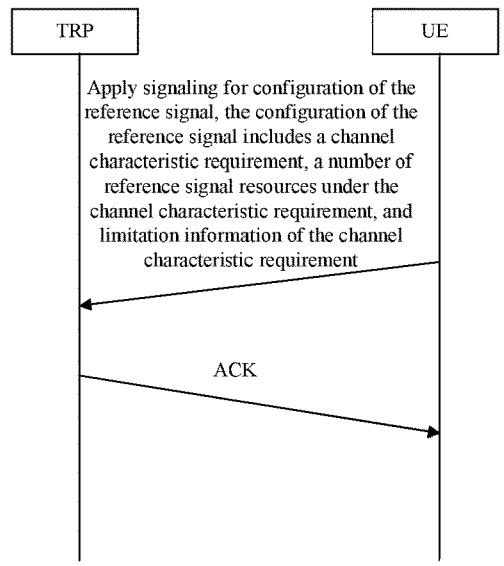
FIG. 12 is a flowchart of a UE sending signaling for applying for reference signal configuration to a TRP in an embodiment of the present disclosure.

FIG. 12 is a flowchart illustrating that a UE sends signaling for applying the configuration of the reference signal to a TRP. The UE sends the signaling for applying for the configuration of the reference signal configuration. The signaling includes a channel characteristic requirement, a number of reference signal resources under the channel characteristic requirement, and limitation information of the channel characteristic requirement. The signaling is used for configuring a beam sweeping at the receiving end or a joint beam sweeping at the sending end and the receiving end. In view that capability and channel characteristic at a UE end are different, and the UE end feeds back its capabilities and demands to the TRP end to facilitate performing the reference signal configuration at the TRP end. Specifically, the TRP is applied to use at least one of the sending beam, the sending end precoding or the transmission node indicated by the channel characteristic requirement to send the reference signal, then the TRP may configure the reference signal configuration by indicating part or all parameter configuration in the signaling. In addition, the channel characteristic requirement of the reference signal resource limiting the first communication node configuration may be supported. The UE end sends a channel characteristic requirement application, which may be used for discovering a potential transmission path and implementing beam recovery. Specifically, the UE notifies channel measurement under the channel characteristic requirement recommended by the TRP through the signaling, and may measure the potential physical link. If the channel quality is higher than the channel quality of the current data transmission link, the TRP may perform the handover of the transmission beam according to the result fed back from the UE end to improve beam recovery or robust communication ability. That is, the second communication node performs trigger configuration of the reference signal configuration on the first communication node, the UE influences a TRP beam sweeping P1/3, a CSI-RS process applied by the UE and a relationship between the CSI-RS process and the QCL, the scanning number of the receiving beam, a QCL-based beam indication and a QCL sending limitation.

That is, the embodiment of the present disclosure further provides a trigger method for reference signal configuration, which is applied to a second communication node. The method includes the steps described below.

The second communication node send signaling to a first communication node, triggers the reference signal configuration sent by the first communication node. The reference signal configuration includes at least one of: a channel characteristic requirement; a number of reference signal resources without the channel characteristic requirement; the number of reference signal resources under the channel characteristic requirement; or limitation information of the channel characteristic requirement.

Furthermore, the channel characteristic requirement refers to request the first communication node to use at least one of the sending beam, the sending end precoding or the transmission node indicated by the channel characteristic requirement to send the reference signal.

Furthermore, the first communication node takes partial or all configuration parameters in the signaling as reference signal configuration information of the first communication node.

The limitation information of the channel characteristic requirement refers to: limit the channel characteristic requirement of a reference signal resource configured by the first communication node.

Based on the solution provided by the embodiments of the present disclosure, the first communication node (e.g., a TRP) may send an instruction to the second communication node (e.g., a UE). For the reference signal configuration which includes channel characteristic requirement information of the reference signal configuration, and mapping information of relevant information on the antenna port and the channel characteristic requirement information, a beam sweeping training for the sending end, the receiving end and a joint receiving and sending end is implemented. Through the mapping information and the measurement limitation for the reference signal, simultaneous training of the reference signal for multiple users is implemented. Such solution, on one hand, reduces limitations of the available beams at the sending end and the receiving end and improves the indication transparency through flexible reference characteristic requirement information, and on the other hand, implements the reference signal sharing under multiple users, and saves the reference signal resources through a method of sharing the reference signal and measurement limitation.

The present disclosure further provides a configuration device for a reference signal.

Figure 13:
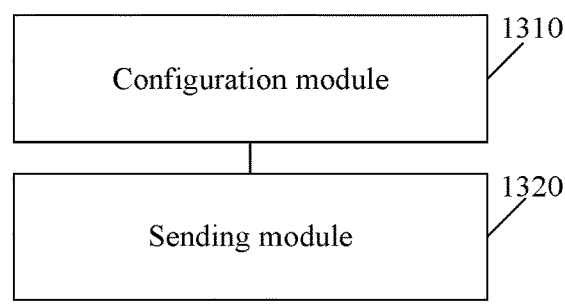
FIG. 13 is a structural diagram of a configuration device for a reference signal in an embodiment of the present disclosure.

As shown in FIG. 13, a configuration device for a reference signal in the present disclosure, applied to a first communication node, includes: a configuration module 1310 and a sending module 1320.

The configuration module 1310 is configured to configure configuration signaling, the configuration signaling carries parameter configuration for N reference signal resources, where the parameter configuration at least includes channel characteristic requirement indication information.

The sending module 1320 is configured to send the configuration signaling to a second communication node so that the second communication node obtains the parameter configuration, where N is an integer greater than or equal to 1.

The embodiment of the present disclosure implements a beam sweeping training for a sending end, a receiving end and a joint receiving and sending end through configuring the channel characteristic requirement indication information of the reference signal resource in the configuration signaling, reduces limitations of the available beams at the sending end and the receiving end through the flexible channel characteristic requirement information, thereby improving the indication transparency, and effectively improving the flexibility at the time of performing the beam measurement at the sending end and the receiving end.

In an embodiment of the present disclosure, sending the configuration signaling to the second communication node includes:

sharing all or part of the configuration signaling to multiple second communication nodes.

In an embodiment of the present disclosure, the configuration signaling indicates to divide the N reference signal resources into S reference signal processes.

An ith reference signal process includes Si reference signal resources, S and Si are integers greater than or equal to 1 and less than or equal to N, a sum of all Si is equal to N.

In an embodiment of the present disclosure, a same antenna port under different reference signal resources has same sending end precoding and a same sending beam; or a same antenna port under a same reference signal resource has same sending end precoding and a same sending beam; or all antenna ports under the same reference signal resource have same sending end precoding and a same sending beam.

In an embodiment of the present disclosure, the channel characteristic requirement indication information at least includes one of:

mapping information of relevant information on the antenna port and channel characteristic requirement information, and the channel characteristic requirement information.

Furthermore, the relevant information on the antenna port at least includes one of:

antenna port information and antenna port density configuration information.

Furthermore, the antenna port density configuration information includes one of:
configuration information of one of: a frequency domain, a time domain in which the any antenna port is located, and a sequence used by any antenna port.

Furthermore, the configuration information at least includes one of:
a pattern, a position, an index or a number.

In an embodiment of the present disclosure, the device further includes a density configuration information module.

The density configuration information module, which is configured to acquire the antenna port density configuration information from a pre-configured antenna port density configuration information set.

Furthermore, in a preset reference signal, each of enabled antenna ports is has a same density, or follows a set antenna port pattern.

Optionally, the antenna port on a time-frequency code resource position indicated by the mapping information follows a specific channel characteristic requirement; or the antenna port on a time-frequency code resource position indicated by the mapping information and relevant information an antenna port on one associated time-frequency code resource position follow the channel characteristic requirement.

Furthermore, the mapping information includes at least one of:
explicit output mapping information;
mapping information selected from a pre-configured mapping relationship set; or preset mapping information.

In an embodiment of the present disclosure, the channel characteristic requirement is an element of a channel characteristic requirement set.

Furthermore, the channel characteristic requirement set includes K channel requirement elements, where K is an integer greater than or equal to 1.

In the K channel requirement elements, K1 channel characteristic requirement elements are a special case of K2 channel characteristic requirement elements; where K1 and K2 are both integers greater than or equal to 1 and less than or equal to K.

In an embodiment of the present disclosure, a channel characteristic includes any one or a combination of any two or more of: a quasi-co-location (QCL), a quasi-co-beam, a sending end precoding, a receiving end spatial filter, a receiving signal power, a horizontal transmission azimuth, a vertical transmission azimuth, a horizontal arrival azimuth, a vertical reception azimuth, average arrival time, cluster arrival time, a correlation coefficient of a time domain channel response, a correlation coefficient of a frequency domain channel response and a spatial correlation coefficient.

Furthermore, the QCL at least includes: delay spread, Doppler spread, Doppler shift, an average gain, an average delay and spatial parameter information.

In an embodiment of the present disclosure, a channel characteristic requirement is a quasi-co-location assumption.

Furthermore, the requirement is an element in a requirement set; and the requirement set includes S requirement elements under different constraint intensities.

Furthermore, the constraint intensity at least includes one of:
sending end precoding of the reference signals being the same;
sending end spatial filters of the reference signals being the same;
receiving end spatial filters of the reference signals being the same;
sending end precoding of the reference signals basically being the same;
sending end spatial filters of the reference signals basically being the same;
receiving end spatial filters of the reference signals basically being the same.

In an embodiment of the present disclosure, in condition that the channel characteristic requirement indication information is configured to be a first channel characteristic requirement, the sending beam or the sending end precoding of the reference signal of the first communication node remains unchanged, and a receiving beam/a receiving end spatial filter of the second communication node may be different; or
in condition that the channel characteristic requirement indication information is configured to be a second channel characteristic requirement, the sending beam of the reference signal of the first communication node may be different, and the receiving beam of the second communication node still receives in a mode of the receiving beam or the spatial filter indicated according to the channel characteristic requirement; or
in condition that the channel characteristic requirement indication information is configured to be a third channel characteristic requirement, the sending beam or the sending end precoding of the reference signal of the first communication node may be different, and the receiving beam/the receiving end spatial filter of the second communication node may be different.

Furthermore, the third channel characteristic requirement is a special case of the first channel characteristic requirement.

The third channel characteristic requirement is a special case of the second channel characteristic requirement.

In an embodiment of the present disclosure, in condition that the channel characteristic requirement indication information is configured to be the first channel characteristic requirement, all N reference signal resources follow the first channel characteristic requirement; or
in condition that the channel characteristic requirement indication information is configured to be the second channel characteristic requirement, all N reference signal resources follow the second channel characteristic requirement; or
in condition that the channel characteristic requirement indication information is configured to be the third channel characteristic requirement, each of R1 reference signal resources follows the first channel characteristic requirement, each of R2 reference signal resources follows the second channel characteristic requirement; where R1 and R2 are both integers greater than or equal to 1 and less than or equal to N.

Furthermore, T1 reference signal resources in the R1 reference signal resources have the same time domain resource interval or the frequency domain resource interval; where T1 is an integer greater than or equal to 1 and less than or equal to R1.

T2 reference signal resources in the R2 reference signal resources have the same time domain resource interval or the frequency domain resource interval; where T2 is an integer greater than or equal to 1 and less than or equal to R1.

In another embodiment of the present disclosure, the parameter configuration further includes configuring measurement limitation information for a preset reference signal; and The measurement limitation information is used for limiting the second communication node to measure the reference signal.

Furthermore, the measurement limitation information acts on Y reference signals, where Y is an integer greater than or equal to N.

Furthermore, the measurement limitation information is marked through a bitmap, or the measurement limitation information is selected from a preset limitation rule.

Furthermore, the step in which the measurement limitation information is marked through the bitmap includes:
in condition that a first character is configured on the bit map, indicating the second communication node to be capable of measuring; or
in condition that a second character is configured on the bit map, indicating the second communication node to be incapable of measuring.

In another embodiment of the present disclosure, the parameter configuration further includes: indicating marking information of an antenna port on a time-frequency code resource position associated in the channel characteristic requirement indication information.

In another embodiment of the present disclosure, the configuration signaling is transmitted in one of the following manners:
a time-frequency code resource bearing association information related to the configuration signaling;
an explicitly outputted correlation value; or
a jointly encoding of the time-frequency code resource bearing association information related to the configuration signaling and the explicitly outputted correlation value.

In another embodiment of the present disclosure, a channel characteristic requirement refers to at least one of the sending beam, the sending end precoding or a transmission node configured for sending the reference signal.

In another embodiment of the present disclosure, the device further includes: a receiving module.

The receiving module is configured to: receive trigger signaling carrying the reference signal resource configuration sent by the second communication node; and configure the configuration signaling according to the trigger signaling.

Furthermore, the reference signal resource configuration includes at least one of:
a channel characteristic requirement;
a number of reference signal resources without the channel characteristic requirement;
the number of reference signal resources under the channel characteristic requirement; or
limitation information of the channel characteristic requirement.

The present disclosure provides a communication node, the communication node includes any configuration device in the embodiments described above.

The present disclosure further provides a communication node. The communication node includes a processor and a storage device, the storage device stores multiple instructions to implement a configuration method for a reference signal, and the processor executes the multiple instructions to implement:
configuring configuration signaling, the configuration signaling carries parameter configuration for N reference signal resources, where the parameter configuration at least includes channel characteristic requirement indication information; and
sending the configuration signaling to a second communication node so that the second communication node obtains the parameter configuration, where N is an integer greater than or equal to 1.

Furthermore, the sending end precoding or the sending beam of the same antenna port under a same reference signal resource is same; or
the sending end precoding or the sending beam of the same antenna port under a same reference signal resource is same; or
the sending end precoding or the sending beam of all antenna ports under the same reference signal resource is same.

The channel characteristic requirement indication information at least includes one of:
channel characteristic requirement information;
mapping information of the relevant information on the antenna port and channel characteristic requirement information.

In an embodiment of the present disclosure, the channel characteristic requirement is an element of a channel characteristic requirement set.

In another embodiment of the present disclosure, the channel characteristic requirement set includes K channel requirement elements, where K is an integer greater than or equal to 1.

In the K channel requirement elements, K1 channel characteristic requirement elements is a special case of K2 channel characteristic requirement elements; where K1 and K2 are both integers greater than or equal to 1 and less than or equal to K.

In another embodiment of the present disclosure, a channel characteristic includes any one or a combination of any two or more: a quasi-co-location (QCL), a quasi-co-beam, a sending end precoding, a receiving end spatial filter, a receiving signal power, a horizontal transmission azimuth, a vertical transmission azimuth, a horizontal arrival azimuth, a vertical reception azimuth, average arrival time, cluster arrival time, a correlation coefficient of a time domain channel response, a correlation coefficient of a frequency domain channel response and a spatial correlation coefficient.

For specific implementation of the communication node in the embodiment of the present disclosure, reference may be made to the embodiments of the configuration method for the reference signal described above.

It is to be noted here that the configuration device and the communication node in the present disclosure also have the same technical effects with the configuration method.

The configuration method for the reference signal described in conjunction with the embodiments of the present disclosure may be directly embodied as hardware, a software module executed by a processor, or a combination of the hardware and the software module. For example, for one or more functional block diagrams and at least one combination of the functional block diagrams in the functional block diagrams shown in the drawings, at least one of them not only can correspond to each software module, but also can correspond to each hardware module of the computer program flow. These software modules can respectively correspond to various steps shown in the drawings. These hardware modules may be implemented, for example, by using a field programmable gate array (FPGA) to cure these software modules.

The software modules may be located at a RAM, a flash memory, a ROM, a EPROM, a EEPROM, a register, a hard disk, a mobile hard disk, a CD-ROM or any other form of storage medium known in the art. A storage medium may be coupled to the processor such that the processor is able to read information from, and write information to, the storage medium; or the storage medium may be a component of the processor. The processor and the storage medium may be located in an application specific integrated circuit. The software module may be stored in a memory of the mobile terminal or in a memory card which is insertable into the mobile terminal. For example, if the mobile terminal employs a MEGA-SIM card or a flash memory device with a large capacity, the software module may be stored in the MEGA-SIM card or flash memory device with a large capacity.

For one or more functional block diagrams and at least one combination of the functional block diagrams in the functional block diagrams shown in the drawings, at least one of them may be implemented as a general purpose processor, a digital signal processor (DSP), an application specific integrated circuit (ASIC), a field programmable gate array (FPGA) or another programmable logic apparatus, separate gate or transistor logic device, separate hardware component, or any combination thereof for executing the functions described in the present disclosure. For one or more functional block diagrams and at least one combination of the functional block diagrams in the functional block diagrams shown in the drawings, at least one of them can further implement as a combination of computer devices, such as a combination of the DSP and a microprocessor unit (MPU), multiple microprocessor units, one or more microprocessor units in combination with DSP communication or any other such configuration.

Although the present application describes specific examples of the present disclosure, those skilled in the art can design variations of the present disclosure without departing from the concepts of the present disclosure.

Those skilled in the art also can make various modifications to the present disclosure without departing from the content of the present disclosure under the technical concept of the present disclosure, which also falls within the protection scope of the present disclosure.

What is claimed is:

1. A configuration method for a reference signal, applied to a first communication node, comprising:
    configuring configuration signaling, wherein the configuration signaling carries parameter configuration for N reference signal resources, wherein the parameter configuration at least comprises channel characteristic requirement indication information; and
    sending the configuration signaling to a second communication node, wherein N is an integer greater than or equal to 1;
    wherein a channel characteristic requirement of the channel characteristic requirement indication information is an element of a channel characteristic requirement set, wherein the channel characteristic requirement set comprises K channel characteristic requirement elements, wherein K is an integer greater than or equal to 1;
    in the K channel characteristic requirement elements, K1 channel characteristic requirement elements are a special case of K2 channel characteristic requirement elements, wherein K1 and K2 are both integers greater than or equal to 1 and less than K.

2. The method of claim 1, wherein the channel characteristic requirement indication information comprises at least one of:
    channel characteristic requirement information;
    relevant information on an antenna port.

3. The method of claim 2, wherein the relevant information on the antenna port comprises at least one of:
    antenna port information; or
    antenna port density configuration information.

4. The method of claim 3, wherein the antenna port density configuration information comprises at least one of:
    configuration information of one of: a frequency domain in which any antenna port is located, a time domain in which any antenna port is located, and a sequence used by any antenna port.

5. The method of claim 3, further comprising:
    acquiring the antenna port density configuration information from a pre-configured antenna port density configuration information set.

6. The method of claim 1, wherein the channel characteristic requirement is a quasi-co-location assumption.

7. A non-transitory computer storage medium, which is configured to store execution instructions for executing the method of claim 1.

8. A communication node, wherein the communication node comprises a processor and a storage device, wherein the storage device stores a plurality of instructions to implement a configuration method for a reference signal, and wherein the processor executes the plurality of instructions to implement:
    configuring configuration signaling, wherein the configuration signaling carries parameter configuration for N reference signal resources, wherein the parameter configuration at least comprises channel characteristic requirement indication information; and
    sending the configuration signaling to a second communication node, wherein N is an integer greater than or equal to 1;
    wherein a channel characteristic requirement of the channel characteristic requirement indication information is an element of a channel characteristic requirement set, wherein the channel characteristic requirement set comprises K channel characteristic requirement elements, wherein K is an integer greater than or equal to 1;
    in the K channel characteristic requirement elements, K1 channel characteristic requirement elements are a special case of K2 channel characteristic requirement elements, wherein K1 and K2 are both integers greater than or equal to 1 and less than K.

9. The communication node of claim 8, wherein the channel characteristic requirement indication information at least comprises one of:
    channel characteristic requirement information;
    relevant information on an antenna port.

10. A configuration method for a reference signal, applied to a second communication node, comprising:
    obtaining configuration signaling, wherein the configuration signaling carries parameter configuration for N reference signal resources, wherein the parameter configuration at least comprises channel characteristic requirement indication information, and wherein N is an integer greater than or equal to 1;
    a channel characteristic requirement of the channel characteristic requirement indication information is an element of a channel characteristic requirement set;
    wherein the channel characteristic requirement set comprises K channel characteristic requirement elements, wherein K is an integer greater than or equal to 1;
    in the K channel characteristic requirement elements, K1 channel characteristic requirement elements are a special case of K2 channel characteristic requirement elements, wherein K1 and K2 are both integers greater than or equal to 1 and less than K.

11. The method of claim 10, wherein the channel characteristic requirement indication information at least comprises one of:
channel characteristic requirement information;
relevant information on an antenna port.

12. The method of claim 11, wherein the relevant information on the antenna port comprises at least one of:
antenna port information; or
antenna port density configuration information.

13. The method of claim 12, wherein the antenna port density configuration information comprises at least one of:
configuration information of one of: a frequency domain in which any antenna port is located, a time domain in which any antenna port is located, and a sequence used by any antenna port.

14. The method of claim 12, wherein further comprising:
acquiring the antenna port density configuration information from a pre-configured antenna port density configuration information set.

15. The method of claim 10, wherein a channel characteristic requirement is a quasi-co-location assumption.

16. A user equipment (UE), wherein the UE comprises a processor and a storage device, wherein the storage device stores a plurality of instructions, and wherein the processor executes the plurality of instructions to implement the configuration method for the reference signal of claim 10.

* * * * *